United States Patent
Samy

(10) Patent No.: US 8,393,355 B2
(45) Date of Patent: Mar. 12, 2013

(54) SHORT STROKE CONTROL VALVE

(75) Inventor: Sekhar Samy, Yorba Linda, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 687 days.

(21) Appl. No.: 12/473,640

(22) Filed: May 28, 2009

(65) Prior Publication Data

US 2010/0300565 A1 Dec. 2, 2010

(51) Int. Cl.
*F16K 47/08* (2006.01)
*F16K 1/44* (2006.01)

(52) U.S. Cl. .................. 137/625.3; 137/625.34

(58) Field of Classification Search ............ 137/625.12, 137/625.3–625.38, 625.48–625.5
See application file for complete search history.

(56) References Cited

U.S. PATENT DOCUMENTS

| | | | | |
|---|---|---|---|---|
| 1,122,928 A | * | 12/1914 | Hodges | 251/325 |
| 1,193,577 A | * | 8/1916 | McGowan | 137/625.38 |
| 4,671,321 A | * | 6/1987 | Paetzel et al. | 137/625.3 |
| 4,726,398 A | * | 2/1988 | Barree | 137/625.5 |
| 5,113,908 A | | 5/1992 | Steinke | |
| 5,226,444 A | | 7/1993 | Nagpal et al. | |
| 5,615,708 A | * | 4/1997 | Barron | 137/625.3 |
| 5,687,763 A | * | 11/1997 | Steinke | 137/625.33 |

FOREIGN PATENT DOCUMENTS

GB 2213286 9/1989

OTHER PUBLICATIONS

Search Report and Written Opinion for PCT/US2010/035853.

* cited by examiner

*Primary Examiner* — Eric Keasel
*Assistant Examiner* — Hailey K Do
(74) *Attorney, Agent, or Firm* — Stetina Brunda Garred & Brucker

(57) ABSTRACT

A short stroke flow control device or valve which is adapted to provide velocity control trim in a short stroke. The valve constructed in accordance with the present invention comprises multiple disk stacks or cages which are separated from each other by intervening spacers, and are placed axially in a valve gallery clamped between a seat ring and bonnet of the valve. The fluid passageways in the cages are throttled in a controlled manner by a plug which defines multiple throttling elements or plug lobes, the number of plug lobes defined by the plug preferably being equal to the number of cages included in the valve. The plug lobes of the plug control the flow of fluid through the disk stacks or cages in tandem. All of the throttling elements or plug lobes of the plug, with the possible exception of the plug lobe which contacts the seat ring for closure, is larger in diameter than the remainder of the plug and has at least one kidney bean shaped flow passage extending therethrough. The flow area of such flow passages in the plug lobes is designed to satisfy prescribed seat bore velocity criteria.

9 Claims, 2 Drawing Sheets

SHORT STROKE CONTROL VALVE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates generally to flow control devices and, more particularly, to a uniquely configured control valve which is adapted to provide velocity control trim in a short stroke to accommodate space or design constraints.

2. Description of the Related Art

There is currently known in the prior art control valves which include stems and plugs that are linearly displaced during normal operation of the valve. Within these valves, which are often referred to as linear displacement valves, the plug is disposed and moveable within a disk stack or valve cage which defines a multiplicity of tortuous and/or non-tortuous fluid passageways. Certain linear displacement valves are configured for "over plug flow" wherein fluid flows radially inward into the interior of the valve cage from the exterior thereof, with the fluid undergoing a pressure drop as a result of the flow through the passageways of the valve cage. In this arrangement, the valve is opened by lifting the plug off a seat ring which thus allows the fluid to flow from the interior of the valve cage and out of the valve via the unblocked seat ring. Conversely, movement of the seating surface of the plug into sealed engagement with the complimentary seating surface of the seat ring facilitates a closed or shut-off condition for the valve.

As an alternative to over plug flow, other linear displacement valves are configured for "under plug flow" wherein fluid flows axially upwardly into the interior of the valve cage from the exterior thereof, with the fluid undergoing a pressure drop as a result of the flow of the fluid radially outwardly through the fluid passageways of the valve cage. In this arrangement, the valve is opened by lifting the plug off of the aforementioned seat ring, which thus allows the fluid to flow into the interior of the valve cage and thereafter radially outwardly through the fluid passageways of the valve cage. Conversely, the movement of the seating surface of the plug into sealed engagement with the complimentary seating surface of the seat ring facilitates a closed or shut-off condition for the valve.

Linear displacement control valves are often used to control flow and pressure in a process. However, in some applications and valve designs, there is a limitation in the maximum allowable stroke due to space or design constraints. Such design constraints may be attributable to, for example, the use of bellows seals to prevent leakage through the stem seal in valves used in conjunction with toxic or radioactive process fluid. Thus, there exists a need in the art for a linear displacement control valve which is capable of providing a velocity control trim in a short stroke. The present invention addresses this particular need by providing a short stroke control valve which provides the same velocity control capacity as a conventional normal stroke control valve. These, as well as other features and advantages of the present invention will be described in more detail below.

BRIEF SUMMARY OF THE INVENTION

In accordance with the present invention, there is provided a short stroke flow control device or valve which is adapted to provide velocity control trim in a short stroke. The valve constructed in accordance with the present invention comprises multiple disk stacks or cages which are separated from each other by intervening spacers, and are placed axially in a valve gallery clamped between a seat ring and bonnet of the valve. The fluid passageways in the cages are throttled in a controlled manner by a plug which defines multiple throttling elements or plug lobes, the number of plug lobes defined by the plug preferably being equal to the number of cages included in the valve. The plug lobes of the plug control the flow of fluid through the disk stacks or cages in tandem. All of the throttling elements or plug lobes of the plug, with the possible exception of the plug lobe which contacts the seat ring for closure, is larger in diameter than the remainder of the plug and has at least one kidney bean shaped flow passage extending therethrough. The flow area of such flow passages in the plug lobes is designed to satisfy prescribed seat bore velocity criteria.

In the short stroke control valve of the present invention, the disk stacks or cages each feature labyrinth grooves and seals to reduce the leakage flow pass the plug and to reduce the effects of multiple clearance flows. Additionally, depending on the need for low end throttling, the number of labyrinth grooves within each of the cages may be different between stages. Further, the Cv in each of the disk stacks or cages may be varied to result in an overall custom characteristic curve for the valve. Further, any resistance in flow from upstream sections of the fluid system including the valve of the present invention may be mitigated by varying the number of stages (i.e., cages and plug lobes) at the same lift of the plug. In this regards, the number of cages or disk stacks and the number of plug lobes (which are preferably equal as indicated above) included in the valve may be varied based on the specific application. Still further, the plug may also be configured to be balance or unbalanced.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
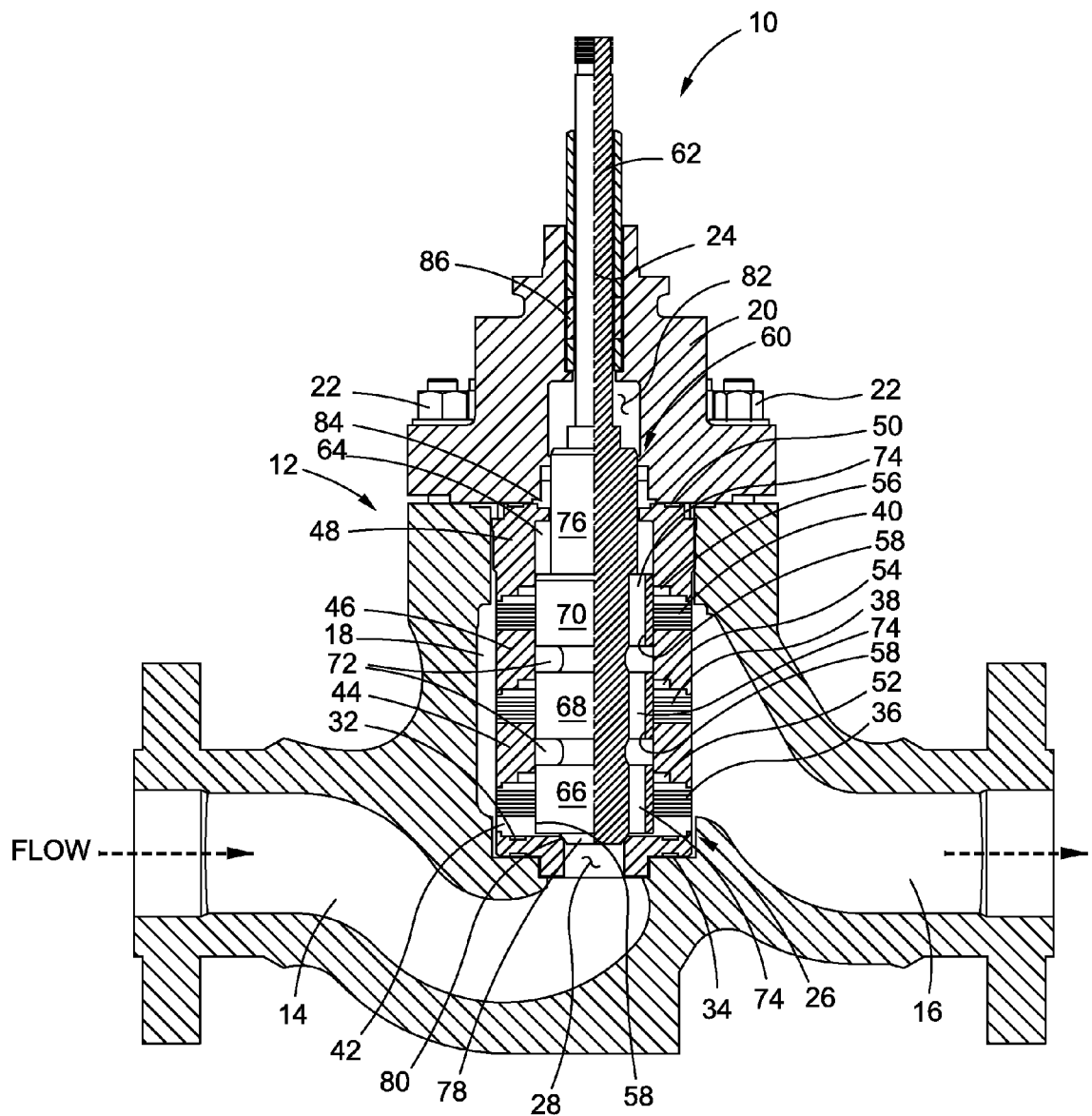
FIG. 1 is a cross-sectional view of a short stroke control valve constructed in accordance with the present invention, illustrating the plug thereof in a closed position.
Figure 2:
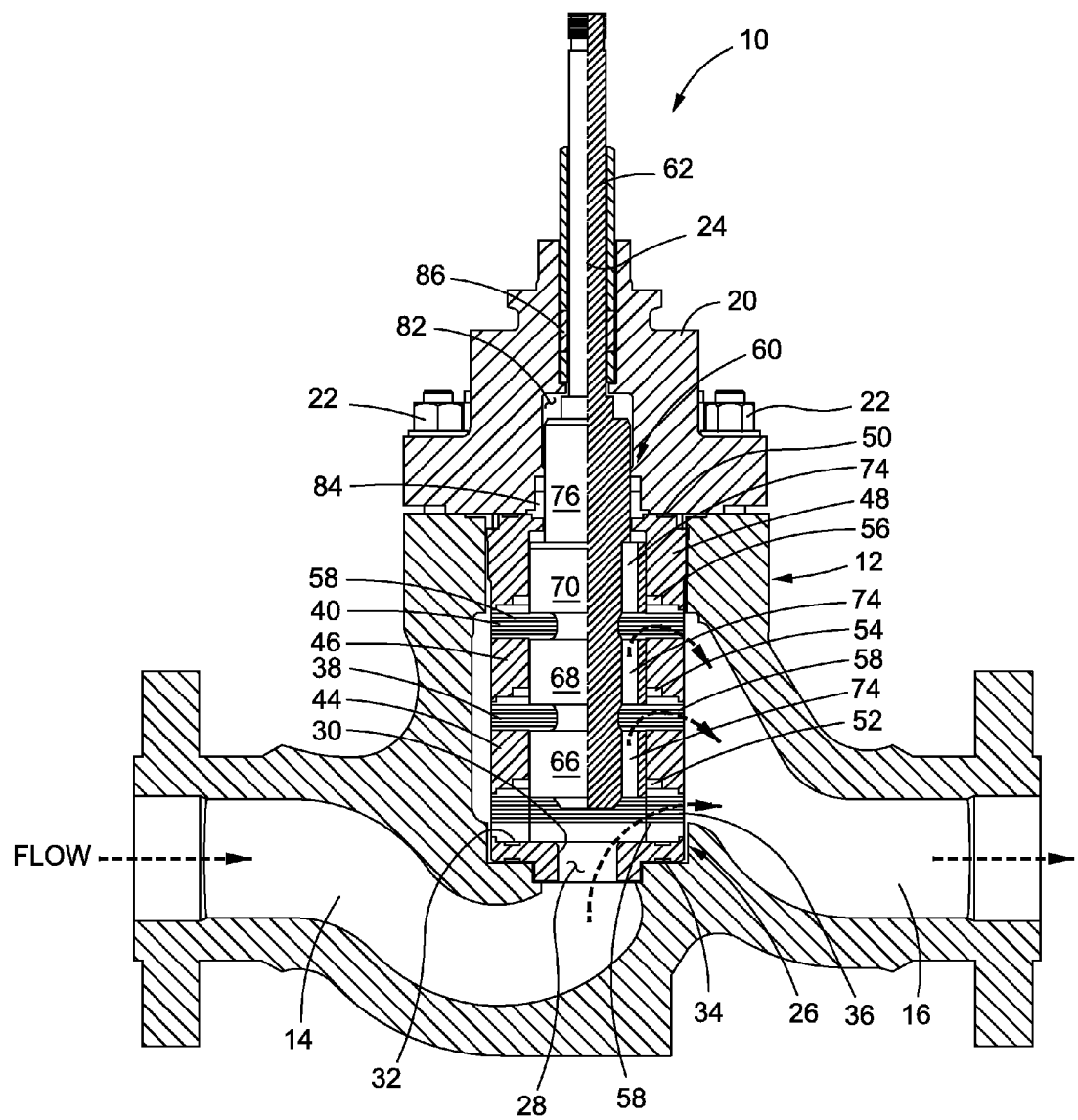
FIG. 2 is a cross-sectional view of the short stroke valve constructed in accordance with the present invention, but illustrating the plug thereof in an open position.

Referring now to the drawings wherein the showings are for purposes of illustrating a preferred embodiment of the present invention only, and not for purposes of limiting the same, FIGS. 1 and 2 are cross-sectional views of a short stroke control valve 10 constructed in accordance with the present invention. As will be described in more detail below, the valve 10 is shown in FIG. 1 in a closed or shut-off position, and is shown in FIG. 2 in an open position which allows for the flow of a fluid therethrough.

The valve 10 comprises a valve body 12 which defines an inflow passage 14 and an outflow passage 16. The inflow and outflow passages 14, 16 each fluidly communicate with an interior chamber or valve gallery 18 defined by the body 12. In addition to the body 12, the valve 10 includes a bonnet 20 which is attached to the body 12 and partially encloses the gallery 18. As seen in FIGS. 1 and 2, the attachment of the bonnet 20 to the body 12 is preferably facilitated through the use of mechanical fasteners 22 comprising a nut and bolt combination, though other attachment methods are contemplated to be within the spirit and scope of the present invention. The bonnet 20 defines a bore 24 which extends axially therethrough, the use of which will be described in more detail below.

Disposed within the gallery 18 of the body 12 is an annular seat ring 26. The seat ring 26 defines a circularly configured inflow opening 28, one end of which is circumvented by a tapered seating surface 30. The seat ring 26 is oriented within the body 12, and in particular the gallery 18 thereof, such that the inflow opening 28 effectively defines a fluid path between the inflow passage 14 and the gallery 18. In addition to the inflow opening 28, the seat ring 26 defines annular top and bottom grooves 32, 34 which are disposed in respective ones of the top and bottom surfaces of a radially extending flange portion of the seat ring 26 in opposed relation to each other, as viewed from the perspective shown in FIGS. 1 and 2. Disposed within each of the top and bottom grooves 32, 34 is a sealing member such as an O-ring or gasket, the use of which will also be described in more detail below.

In addition to the seat ring 26, disposed within the gallery 18 are three (3) flow control elements, and more particularly a first (lower) disk stack or cage 36, a second (middle) disk stack or cage 38, and a third (upper) disk stack or cage 40. The first, second and third cages 36, 38, 40 each preferably have an annular configuration, and define a multiplicity of tortuous and/or non-tortuous fluid energy dissipating flow passageways extending radially therethrough (i.e., between the inner and outer circumferential surfaces thereof). In the valve 10, the first cage 36 is separated from the seat ring 26 by an intervening annular first spacer 42. More particularly, the bottom surface of the first cage 36, when viewed from the perspective shown in FIGS. 1 and 2, is abutted against the top surface of the first spacer 42, with the opposed bottom surface of the first spacer 42 being abutted against the top surface of the radially extending flange portion of the seat ring 26.

Similar to first cage 36 being separated from the seat ring 26 by the first spacer 42, the second cage 38 is separated from the first cage 36 by an intervening annular second spacer 44. In this regard, when viewed from the perspective shown in FIGS. 1 and 2, the bottom surface of the second cage 38 is abutted against the top surface of the second spacer 44, with the bottom surface of the second spacer 44 being abutted against the top surface of the first cage 36. In a similar fashion, the third cage 40 is separated from the second cage 38 by an intervening annular third spacer 46. More particularly, when viewed from the perspective shown in FIGS. 1 and 2 the bottom surface of the third cage 40 is abutted against the top surface of the third spacer 46, with the bottom surface of the third spacer 46 being abutted against the top surface of the second cage 38.

In addition to the first, second and third spacers 42, 44, 46 described above, the valve 10 includes an annular fourth spacer 48 which extends between the bonnet 20 and the first cage 36. More particularly, when viewed from the perspective shown in FIGS. 1 and 2, the top surface of the fourth spacer 48 is abutted against the bonnet 20, with the opposed bottom surface of the fourth spacer 48 being abutted against the top surface of the third cage 40. Disposed within the top surface of the fourth spacer 48 which is opposite the bottom surface abutted against the third cage 40 is an annular groove 50 which accommodates a sealing member such as an O-ring or gasket.

As further seen in FIGS. 1 and 2, partially captured between the second spacer 44 and the first cage 36 is an annular first seal 52. Similarly, partially captured between the third spacer 46 and the second cage 38 is an annular second seal 54, while partially captured between the fourth spacer 48 and the third cage 40 is an annular third seal 56. In the valve 10, the second and third spacers 44, 46 are preferably identically configured to each other, and thus are of equal size. However, the first spacer 42 is of substantially reduced height in comparison to the second and third spacers 44, 46, with the fourth spacer 48 having an increased height in comparison to the second and third spacers 44, 46.

As is further seen in FIGS. 1 and 2, formed in the entirety of the inner circumferential surface of the first spacer 42 are a plurality of labyrinth grooves 58. Thus, the labyrinth grooves 58 within the first spacer 42 extend from the top surface of the radially extending flange portion of the seat ring 26 to the first cage 36. Labyrinth grooves 58 are also formed in portions of the inner circumferential surfaces of the second and third spacers 44, 46. More particularly, labyrinth grooves 58 are formed in an upper portion of the inner circumferential surface of the second spacer 44, the labyrinth grooves 58 of the second spacer 44 thus extending to the top surface thereof and hence to the second cage 38. Similarly, labyrinth grooves 58 are formed in the upper portion of the inner circumferential surface of the third spacer 46, the labyrinth grooves 58 of the third spacer 46 thus extending to the top surface thereof and hence to the third cage 40. The labyrinth grooves 58 of the first, second and third spacers 42, 44, 46 are used to create labyrinth seals within the valve 10, as will be discussed in more detail below.

As is apparent from FIGS. 1 and 2, when the first, second and third cages 36, 38, 40 and the first, second, third and fourth spacers 42, 44, 46, 48 are stacked upon the seat ring 26 in the aforementioned manner, the outer circumferential surfaces of these particular components are substantially aligned with each other. Also in substantial alignment with each other are the inner circumferential surfaces of the stacked first, second and third cages 36, 38, 40 and first, second, third and fourth spacers 42, 44, 46, 28. Importantly, the first, second and third seals 52, 54, 56 are oriented such that the inner circumferential surfaces thereof are also substantially aligned with the inner circumferential surfaces of the stacked, first, second and third cages 36, 38, 40, and first, second, third and fourth spacers 42, 44, 46, 48. However, the inner circumferential surface of the seat ring 26 which defines the inflow opening 28 thereof is oriented radially inward relative to the aligned inner circumferential surfaces of the first, second and third cages 36, 38, 40 and first, second, third and fourth spacers 42, 44, 46, 48.

In addition to the foregoing, in the valve 10, the stack seat ring 26, first, second and third cages 36, 38, 40, the first, second, third and fourth spacers 42, 44, 46, 48, and the first, second and third seals 52, 54, 56 are effectively compressed in an axial direction when viewed from the perspective shown in FIGS. 1 and 2 between the bonnet 20 and the body 12. As a result, the gasket disposed within the bottom groove 34 of the seat ring 26 is effectively compressed between the radially extending flange portion thereof and the body 12 thereby creating a fluid-tight seal therebetween. Additionally, the gasket disposed within the top grooves 32 of the seat ring 26 is effectively compressed between the radially extending flange portion thereof and the bottom surface of the first spacer 42 thereby creating a fluid-tight seal therebetween. Similarly, the gasket disposed within the groove 50 of the fourth spacer 48 is compressed between the bonnet 20 and the fourth spacer 48 thereby creating a fluid-tight seal therebetween.

The valve 10 constructed in accordance with the present invention further comprises an elongate, generally cylindrical plug 60. Integrally connected to and protruding axially from one end of the plug 60 is an elongate, generally cylindrical stem 62. As seen in FIGS. 1 and 2, the plug 60 resides predominantly within the gallery 18 and, more particularly, within an elongate bore 64 collectively defined by the aligned inner circumferential surfaces of the first, second and third cages 36, 38, 40, and the first, second, third and fourth spacers 42, 44, 46, 48. The stem 62 protruding from the plug 60 is advanced through the bore 24 defined by the bonnet 20. Though not shown in FIGS. 1 and 2, it is contemplated that the portion of the stem 62 protruding from the bonnet 20 may be mechanically coupled to an actuator which is operative to selectively move the stem in either an upward or downward direction relative to the body 12 and bonnet 21 when viewed from the perspective shown in FIGS. 1 and 2. In this respect, the bore 24 and stem 62 are sized relative to each other such that the stem 62 is slidably moveable within the bore 24 in a reciprocal fashion. As will be recognized by those of ordinary skill in the art, the selective movement of the stem 62 in an upward or downward direction in turn facilitates the concurrent movement of the plug 60 in an upward or downward direction relative to the body 12 and bonnet 20, and hence the stacked seat ring 26, first, second and third cages 36, 38, 40, and first, second, third and fourth spacers 42, 44, 46, 48. In this respect, as will be described in more detail below, the plug 60 is selectively moveable by the stem 62 between the above-described closed or shut-off position shown in FIG. 1, and the open position shown in FIG. 2.

The plug 60 of the valve 10 comprises three identically configured, generally cylindrical plug lobes and, more particularly, a first (bottom) plug lobe 66, a second (middle) plug lobe 68, and a third (top) plug lobe 70. The first and third plug lobes 66, 70 are separated from the second plug lobe 68 by a spaced pair of continuous channels 72, each of the channels 72 having a generally U-shaped cross-sectional configuration. In the valve 10, the outer diameters of the first, second and third plug lobes 66, 68, 70 are equal to each other, and slightly less than the diameter of the bore 64, thus allowing the plug 60 to be reciprocally movable therein between the closed and open positions.

Formed within each of the first, second and plug lobes 66, 68, 70 is at least one flow passage 74. As is apparent from FIGS. 1 and 2, the flow passages 74 are generally linearly aligned with each other, and are radially offset from the aligned axes of the first, second and third plug lobes 66, 68, 70, though extending in generally parallel relation thereto. More particularly, the flow passage 74 disposed in the first plug lobe 66 extends between the bottom surface of the first plug lobe 66 and that channel 72 separating the same from the second plug lobe 68. The flow passage 74 disposed within the second plug lobe 68 extends between the channels 72, with the flow passage 74 disposed within the first plug lobe 66 extending between the top surface of the third plug lobe 70 and the channel 72 separating the same from the second plug lobe 68. Though not apparent from FIGS. 1 and 2, each of the channels 72 is preferably formed so as to have a kidney bean shaped cross-sectional configuration.

In addition to the first, second and third plug lobes 66, 68, 70, the plug 60 includes a cylindrically configured plug body 76 which protrudes axially from the top surface of the third plug lobe 70 when viewed from the perspective shown in FIGS. 1 and 2. In this regard, the stem 62 is connected to and extends axially from the plug body 76. As also apparent from FIGS. 1 and 2, the outer diameter of the plug body 76 is less than the outer diameters of the first, second and third plug lobes 66, 68, 70. The plug 60 also includes a sealing protrusion 78 which is formed on and extends axially from the bottom surface of the first plug lobe 66 when viewed from the perspective shown in FIGS. 1 and 2. The sealing protrusion 78 defines a tapered, peripheral sealing surface 80 which is sized and configured to be complimentary to and to engage the sealing surface 30 defined by the seat ring 26 when the plug 60 is moved to its closed position.

As indicated above, the valve 10, and in particular the plug 60 thereof, is shown in its closed or shut-off position in FIG. 1. When the plug 60 is in the closed position, the seating surface 80 defined by the seating protrusion 78 of the plug 60 is firmly seated and sealed against the complimentary seating surface 30 defined by the seat ring 26. As a result, fluid flowing through the inflow passage 14 of the body 12 in the direction designated by the flow direction arrow in FIG. 1, though also flowing into the inflow opening 28 of the seat ring 26, is effectively blocked from flowing into the bore 64 (and hence the gallery 18) by the plug 60. When the plug 60 is in its closed position, a portion of the plug body 76 resides within a complimentary opening 82 defined by the bonnet 20, such opening 82 being coaxially aligned with the bore 64 collectively defined by the aligned inner circumferential surfaces of the first, second and third cages 36, 38, 40, and the first, second, third and fourth spacers 42, 44, 46, 48.

The movement of the plug 60 to its open position is facilitated by the upward movement of the stem 62 in any amount which is sufficient to cause the bottom surface of the first plug lobe 66 to be elevated above the bottom surface of the first cage 36 when viewed from the perspective shown in FIGS. 1 and 2. As will be recognized, such upward movement of the plug 60 facilitates the separation of the sealing surfaces 30, 80 from each other, thus allowing fluid to enter the bore 64. In FIG. 2, the plug 60 of the valve 10 is shown in its fully open position, i.e., the maximum extent of its upward movement when viewed from the perspective shown in FIGS. 1 and 2.

When the plug 60 is moved to its open position as shown, for example, in FIG. 2, fluid is able to flow from the inflow passage 14, through the inflow opening 28, through the interior of the first spacer 42, and thereafter into the interior of the first cage 36. Thus, fluid initially fills that portion of the bore 24 collectively defined by the inner circumferential surfaces of the first spacer 42 and first cage 36. Fluid entering the interior of the first cage 36 is able to flow radially outwardly through the tortuous and/or non-tortuous flow passageways defined thereby in the manner shown by the flow directional arrows included in FIG. 2. After exiting the fluid flow passageways of the first cage 36 at the outer circumferential surface thereof, the fluid is able to flow into the outflow passage 16 defined by the body 12.

As is also shown in FIG. 2, in addition to the fluid flowing radially outwardly through the flow passageways of the first cage 36, a portion of the fluid also flows upwardly through the flow passage 74 defined by the first plug lobe 66. Upon exiting such flow passage 74, the fluid enters the channel 72 separating the first plug lobe 66 from the second plug lobe 68. When the plug 60 is in an open position, at least a portion of the channel 72 between the first and second plug lobes 66, 68 is radially aligned with the second cage 38, and in particular the inner circumferential surface thereof. In this regard, fluid flowing into the channel 72 between the first and second plug lobes 66, 68 flows radially outwardly through the tortuous and/or non-tortuous flow passageways defined by the second cage 38 in the manner shown by the flow directional arrows included in FIG. 2, the fluid exiting such flow passageways at the outer circumferential surface of the second cage 38 also flowing into the outflow passage 16.

In addition to the fluid flowing radially outwardly through the flow passageways of the second cage 38, a portion of the fluid also flows upwardly through the flow passage 74 defined by the second plug lobe 68. Upon exiting such flow passage 74, the fluid enters the channel 72 separating the second plug lobe 68 from the third plug lobe 70. When the plug 60 is in an open position, at least a portion of the channel 72 between the second and third plug lobes 68, 70 is radially aligned with the third cage 40, and in particular the inner circumferential surface thereof. In this regard, fluid flowing into the channel 72 between the second and third plug lobes 68, 70 flows radially outwardly through the tortuous and/or non-tortuous flow passageways defined by the third cage 40 in the manner shown by the flow directional arrows included in FIG. 2, the fluid exiting such flow passageways at the outer circumferential surface of the third cage 40 also flowing into the outflow passage 16.

As is further seen in FIG. 2, a portion of the fluid which flows into the channel 72 separating the second and third plug lobes 68, 70 from each other is also able to flow upwardly through the flow passage 74 of the third plug lobe 70. As is apparent from FIG. 2, fluid exiting the flow passage 74 of the third plug lobe 70 enters a portion of the bore 64 defined by a portion of the inner circumferential surface of the fourth spacer 48. Such flow through the flow passage 74 of the third plug lobe 70 makes the plug 60 "balanced" within the valve 10. However, those of ordinary skill in the art will recognize that the plug 60 of the valve 10 may alternatively be "unbalanced" by not including the flow passage 74 within the third plug lobe 70.

As the plug 60 is moved from its closed position shown in FIG. 1 to its fully open position shown in FIG. 2, the plug body 76 of the plug 60 is increasingly retracted into the opening 82 defined by the bonnet 20. Conversely, when the plug 62 is moved from its fully open position back to its closed position, the plug body 76 is partially advanced out of the opening 82. Despite the reciprocal movement of the plug body 76 into and out of the opening 82, any fluid entering the bore 64 above the thirds plug lobe 70 when viewed from the perspective shown in FIGS. 1 and 2 (irrespective of whether the plug 60 is balanced or unbalanced) is prevented from flowing between the plug body 76 and the bonnet 20 by an annular seal 84 which is captured therebetween. As will be recognized by those of ordinary skill in the art, as the plug 60 moves between its closed and open positions, the plug body 76 is slidably moveable along an inner circumferential surface of the seal 84 in a reciprocal fashion. To the extent that any fluid is able to migrate between the plug body 76 and the seal 84, such fluid is prevented from escaping to the ambient environment by an annular packing 86 interposed between the outer surface of the stem 62 and that surface of the bonnet 20 defining the bore 24 extending therethrough. As will also be recognized by those of ordinary skill in the art, as the plug 60 moves between its closed and open positions, the stem 62 is also slidably moveable along the inner circumferential surface of the packing 86 in a reciprocal fashion.

In the valve 10, it is contemplated that the number of cages (e.g., the first, second and third cages 36, 38, 40) and the number of plug lobes (e.g., the first, second and third plug lobes 66, 68, 70) will always be equal, and define the number of "stages" included in the valve 10. Thus, in the exemplary configuration shown in FIGS. 1 and 2, the valve 10 includes three (3) stages attributable to the inclusion of the first, second and third cages 36, 38, 40 and the first, second and third plug lobes 66, 68, 70 of the plug 60. However, those of ordinary skill in the art will recognize that the valve 10 may be constructed so as to include greater or fewer than three stages without departing from the spirit and scope of the present invention, it being contemplated that the number of stages included in the valve 10 will be no less than two, but potentially three or more. Irrespective of the number of stages included in the valve 10, the first, second and third seals 52, 54, 56 and the labyrinth grooves 58 described above work in concert with each other to effectively reduce leakage flow as the plug 60 moves between its closed and open positions. In this regard, the first, second and third seals 52, 54, 56 and labyrinth grooves 58 described above reduce leakage flow past the interfaces between the plug 60 and flow control assembly comprising the stacked seat ring 26, first, second and third cages 36, 38, 40, and first, second, third and fourth spacers 42, 44, 46, 48 as the plug 60 moves between its closed and open positions.

In addition to the foregoing, based on the aforementioned description of fluid flow through the valve 10, such valve 10 is configured for under plug flow. However, those of ordinary skill in the art will recognize that valve 10 may also be configured for over plug flow without departing from the spirit and scope of the present invention. In an over plug flow condition, the outflow passage 16 would become the inflow passage, with fluid flowing therethrough toward the flow control assembly comprising the stacked seat ring 26, first, second and third cages 36, 38, 40, and first, second, third and fourth spacers 42, 44, 46, 48. Once reaching this stacked flow control assembly, the fluid would flow radially inwardly through the tortuous and/or non-tortuous flow passageways defined by the first, second and third cages 36, 38, 40. If the plug 60 is in its closed position as shown in FIG. 1, the fluid would be prevented or blocked from entering the bore 64 by respective ones of the first, second and third plug lobes 66, 68, 70 of the plug 60.

However, when the plug 60 is moved to its open position as shown in FIG. 2, fluid would be able to flow from the flow passageways of the third cage 40 into the channel 72 between the third and second plug lobes 70, 68, from the flow passageways of the second cage 38 into the channel 72 between the second and first plug lobes 68, 66, and from the flow passageways of the first cage 36 into that portion of the bore 64 collectively defined by the first cage 36 and first spacer 42. Fluid entering the channel 72 between the third and second plug lobe 70, 68 would also flow downwardly into that portion of the bore 64 collectively defined by the first cage 36 and first spacer 42 via the flow passages 74 disposed in the first and second plug lobe 66, 68 and the channel 72 therebetween. Similarly, fluid entering the channel 72 between the first and second plug lobes 66, 68 would also flow into that portion of the bore 64 collectively defined by the first cage 36 and first spacer 42 via the flow passage 74 disposed within the first plug lobe 66. As will be recognized, fluid flowing into that portion of the bore 64 collectively defined by the first cage 36 and first spacer 42 would thereafter flow downwardly through the inflow opening 28 of the seat ring 26, and thereafter through the outflow passage which would be defined by the inflow passage 14 if the valve 10 were used in an over plug flow configuration.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A short stroke valve for regulating the flow of a fluid, the valve comprising:
    a housing defining a fluid inlet and a fluid outlet;
    a flow control assembly disposed within the housing between the fluid inlet and the fluid outlet, the flow control assembly including at least first, second and third cages which are disposed in spaced relation to each other and each define at least two flow passageways configured to dissipate energy in a fluid flowing therethrough; and
    a plug disposed within the housing and reciprocally moveable between closed and open positions relative thereto, the plug comprising at least first, second and third plug lobes which are disposed in spaced relation to each other;
    the first, second and third cages and the first, second and third plug lobes being sized, configured and positioned relative to each other such that the first, second and third plug lobes will simultaneously block the flow of fluid through respective ones of the first, second and third cages when the plug is in the closed position, and will allow for the simultaneous flow of fluid through the first, second and third cages when the plug is in the open position, the plug being configured such that at least some fluid will flow therethrough between the first, second and third lobes thereof to reach the second and third cages when the plug is in the open position.

2. The short stroke valve of claim 1 wherein:
    the first and second plug lobes are separated by a first channel which is continuous;
    the second and third plug lobes are separated by a second channel which is continuous;
    the first plug lobe of the plug includes a flow passage extending therethrough which fluidly communicates with the first channel; and
    the second plug lobe of the plug includes a flow passage extending therethrough which fluidly communicates with the first and second channels.

3. The short stroke valve of claim 2 wherein:
    the first, second and third plug lobes each have a generally cylindrical configuration and are each of a first diameter, with the first channel extending circumferentially between the first and second plug lobes and the second channel extending circumferentially between the second and third plug lobes;
    the first and third plug lobe each defines an end surface, the flow passage of the first plug lobe extending between the first channel and the end surface of the first plug lobe; and
    the plug further comprises a generally cylindrical plug body which protrudes axially from the end surface of the third plug lobe and is of a second diameter which is less than the first diameter.

4. The short stroke valve of claim 3 wherein the third plug lobe of the plug includes flow passage extending therethrough between the second channel and the end surface of the third plug lobe.

5. The short stroke valve of claim 3 wherein the flow control assembly further comprises a first spacer extending between the first and second cages and a second spacer extending between the second and third cages, the first spacer being sized and configured such that the first channel is radially aligned therewith when the plug is in the closed position, with the second spacer being sized and configured such that the second channel is radially aligned therewith when the plug is in the closed position.

6. The short stroke valve of claim 5 wherein:
    the plug further comprises a sealing protrusion which protrudes from the first plug lobe and defines a peripheral sealing surface;
    the flow control assembly further comprises an annular seat ring defining a flow opening which extends therethrough and a sealing surface which circumvents the flow opening;
    the seat ring is separated from the first cage by a third spacer; and
    the sealing surfaces of the plug and the seat ring have complimentary configurations and are maintained in sealed engagement to each other when the plug is in the closed position.

7. The short stroke valve of claim 6 wherein:
    the first, second and third cages and the first, second and third spacers each have generally annular configurations defining inner circumferential surfaces; and
    the seat ring, the first, second and third cages, and the first, second and third spacers are stacked upon each other such that the inner circumferential surfaces collectively form a generally cylindrical bore which is sized and configured to at least partially accommodate the plug.

8. The short stroke valve of claim 7 wherein the first, second and third cages each preferably comprise a plurality of disks which are stacked upon each other and collectively define a multiplicity of energy dissipating flow passageways which extend radially therethrough.

9. The short stroke valve of claim 7 further comprising an annular first seal partially captured between the first cage and the first spacer, and an annular second seal partially captured between the second cage and the second spacer, the first and second seals partially defining the bore.

* * * * *